United States Patent
Yamauchi et al.

(10) Patent No.: US 9,467,947 B2
(45) Date of Patent: Oct. 11, 2016

(54) COMMUNICATIONS APPARATUS, SYSTEM, AND COMMUNICATIONS METHOD

(71) Applicant: FUJITSU LIMITED, Kawasaki-shi, Kanagawa (JP)

(72) Inventors: Hiromasa Yamauchi, Usakos (NA); Koichiro Yamashita, Hachioji (JP); Takahisa Suzuki, Yokohama (JP); Koji Kurihara, Kawasaki (JP); Toshiya Otomo, Kawasaki (JP); Yuta Teranishi, Fukuoka (JP)

(73) Assignee: FUJITSU LIMITED, Kawasaki (JP)

( * ) Notice: Subject to any disclaimer, the term of this patent is extended or adjusted under 35 U.S.C. 154(b) by 55 days.

(21) Appl. No.: 14/633,488

(22) Filed: Feb. 27, 2015

(65) Prior Publication Data

US 2015/0181528 A1    Jun. 25, 2015

Related U.S. Application Data

(63) Continuation of application No. PCT/JP2012/071679, filed on Aug. 28, 2012.

(51) Int. Cl.
  *G08C 17/00* (2006.01)
  *H04W 52/02* (2009.01)
  *H04W 84/18* (2009.01)

(52) U.S. Cl.
  CPC ..... *H04W 52/0258* (2013.01); *H04W 52/0277* (2013.01); *H04W 84/18* (2013.01); *Y02B 60/50* (2013.01)

(58) Field of Classification Search
  CPC ........... H04W 52/0258; H04W 84/18; H04W 52/0277; Y02B 60/50
  See application file for complete search history.

(56) References Cited

U.S. PATENT DOCUMENTS 7,133,373 B2 * 11/2006 Hester .................... H04L 45/00
                                                    370/311
8,060,154 B1 * 11/2011 Bali .................. H04W 52/0258
                                                    455/522

(Continued)

FOREIGN PATENT DOCUMENTS

JP       2003-174382       6/2003
JP       2007-97358        4/2007

(Continued)

OTHER PUBLICATIONS

International Search Report mailed Oct. 23, 2012 in corresponding International Patent Application No. PCT/JP2012/071679.

(Continued)

*Primary Examiner* — Clemence Han
(74) *Attorney, Agent, or Firm* — Staas & Halsey LLP

(57) ABSTRACT

A sensor node executes any one among a first operation by which another sensor node is requested to execute data process and if the request is not accepted the sensor node starts executing the data processing after waiting for charging and a second operation by which the sensor node starts executing the data processing after waiting for charging, without requesting the data processing to be executed. The sensor node compares an expected value of a first time that elapses until execution is started by the sensor node or the other sensor node when the first operation is executed, and a second time that elapses until execution is started by the sensor node when the second operation is executed. Based on the comparison result, the sensor node executes among the first operation and the second operation, the operation for which the time that elapses until execution is started is shorter.

10 Claims, 10 Drawing Sheets

(56) References Cited

U.S. PATENT DOCUMENTS

| | | | |
|---|---|---|---|
| 8,149,715 B1* | 4/2012 | Goel | H04L 45/123 370/238 |
| 2008/0192666 A1* | 8/2008 | Koskan | H04W 52/0261 370/311 |
| 2010/0112959 A1 | 5/2010 | Nakagawa et al. | |
| 2014/0051379 A1* | 2/2014 | Ganesh | H04M 1/72538 455/404.1 |

FOREIGN PATENT DOCUMENTS

| | | |
|---|---|---|
| JP | 2008-148124 | 6/2008 |
| JP | 2010-114484 | 5/2010 |
| JP | 2011-13765 | 1/2011 |
| JP | 2011-155556 | 8/2011 |
| JP | 2012-65166 | 3/2012 |

OTHER PUBLICATIONS

K. Ota et al., "Extension of Network Lifetime Using Cooperative ARQ Protocol for Solar Energy Harvesting Wireless Sensor Networks," *IEICE Technical Report*. USN2010-1 (May 2010), May 14, 2010, pp. 1-4

K. Ota et al., "Cooperative Transmission Scheme with Inactive Node Reactivation Condition for Solar-Powered Wireless Sensor Networks," *2011 IEEE 22nd International Symposium on Personal Indoor and Mobile Radio Communications (PIMRC)*, Sep. 14, 2011, pp. 2384-2388.

Extended European Search Report dated Aug. 13, 2015 in corresponding European Patent Application No. 12883686.3.

* cited by examiner

COMMUNICATIONS APPARATUS, SYSTEM, AND COMMUNICATIONS METHOD

CROSS REFERENCE TO RELATED APPLICATIONS

This application is a continuation application of International Application PCT/JP2012/071679, filed on Aug. 28, 2012 and designating the U.S., the entire contents of which are incorporated herein by reference.

FIELD

The embodiment discussed herein is related to a communications apparatus, a system, and a communications method.

BACKGROUND

According to a conventionally known technique, in a communications apparatus, power is supplied to a wireless communications unit only when communication is performed and during standby, power is supplied to only a communication invoking signal receiving unit that has low power consumption, whereby power consumption is reduced (for example, refer to Japanese Laid-Open Patent Publication No. 2003-174382). Further, according to another known technique, concerning a microprocessor, by transitioning from an active state to a power-off state or a standby mode, power consumption is reduced (for example, refer to Japanese Laid-Open Patent Publication No. 2010-114484).

Wireless sensor networks (WSN) are further known in which plural sensor-equipped wireless terminals are interspersed in a given space and work in concert to enable environmental and/or physical states to be obtained. For example, by equipping the wireless terminals with a battery and a capacitor, the battery life can be improved (for example, refer to Japanese Laid-Open Patent Publication No. 2008-148124).

Further, for example, according to a known technique, at each wireless terminal, the power generated by an ambient energy harvesting apparatus of the wireless terminal is stored; and an apparatus that aggregates information from the wireless terminals detects the amount of power generated and stored by each terminal, and manages the operating state of each terminal (for example, refer to Japanese Laid-Open Patent Publication No. 2011-13765).

For example, according to another known technique, a terminal that can move about in a sensor network has an energy storage unit that can store electrical power, and the terminal moves about supplying electrical power to other wireless terminals (for example, refer to Japanese Laid-Open Patent Publication No. 2007-97358).

Further, according to another known technique, an apparatus that aggregates information from wireless terminals is equipped with a solar panel (for example, refer to Japanese Laid-Open Patent Publication No. 2011-155556).

Nonetheless, at a terminal that is charged by the electrical power generated by the terminal and executes data processing by using the charged electrical power, execution of the data processing may be suspended if the electrical power is depleted. In this case, the execution of the data processing is resumed after waiting for charging of electrical power to execute the data processing and therefore, completion of the data processing is delayed.

SUMMARY

According to an aspect of an embodiment, a given communications apparatus included among plural first communications apparatuses, performs multi-hop communication with the plural first communications apparatuses and thereby, transmits execution results of data processing performed at the given communications apparatus to a second communications apparatus that performs a process based on the execution results. The given communications apparatus includes a harvester that charges a battery with self-generated electrical power; a micro control unit that when execution of the data processing is suspended based on a remaining amount of the charged electrical power, can execute any one among a first operation by which a request signal requesting execution of the data processing is transmitted to another communications apparatus among the plural first communications apparatuses, and when the request of the request signal is accepted by the other communications apparatus, the data processing is not executed by the given communications apparatus, and when the request of the request signal is not accepted by the other communications apparatus, the execution of the data processing is started by the given communications apparatus after electrical power enabling the execution of the data processing to be completed is charged by the harvester, and a second operation by which, without transmission the request signal to the other communications apparatus, the execution of the data processing is started by the given communications apparatus after the electrical power enabling the execution of the data processing to be completed is charged by the harvester; and a power management unit that obtains an expected value of a first time that elapses until the execution of the data processing is started by the micro control unit or the other communications apparatus in a case of the first operation being executed based on a probability that the other communications apparatus will accept the request for the execution of the data processing; obtains a second time that elapses until the execution of the data processing is started by the micro control unit after the electrical power enabling the execution of the data processing to be completed is charged by the harvester, in a case of the second operation being executed; compares the obtained expected value of the first time unit and the obtained second time; and when the remaining amount of charged electrical power becomes less than a threshold, causes the micro control unit to execute any one among the first operation and the second operation, based on a comparison result obtained by the power management unit.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Embodiments of a communications apparatus, a system, and a communications method according to the present invention will be described in detail with reference to the accompanying drawings. In a sensor network system described in the present embodiment, numerous sensors are installed in a given area; each of the sensors wirelessly transmits detection information related to detection by the sensor, and collects detection information via a parent device that can wirelessly communicate with the sensors in the given area. The given area, for example, is an area filled with matter such as concrete, soil, air, etc. Herein, a wireless communications apparatus equipped with a sensor and a processor capable of processing data related to sensing by the sensor is called a sensor node. Detection information of each sensor node and the results of data processing related to the detection information are assumed to reach the parent device directly or by relayed transfer via other sensor nodes.

Figure 1:
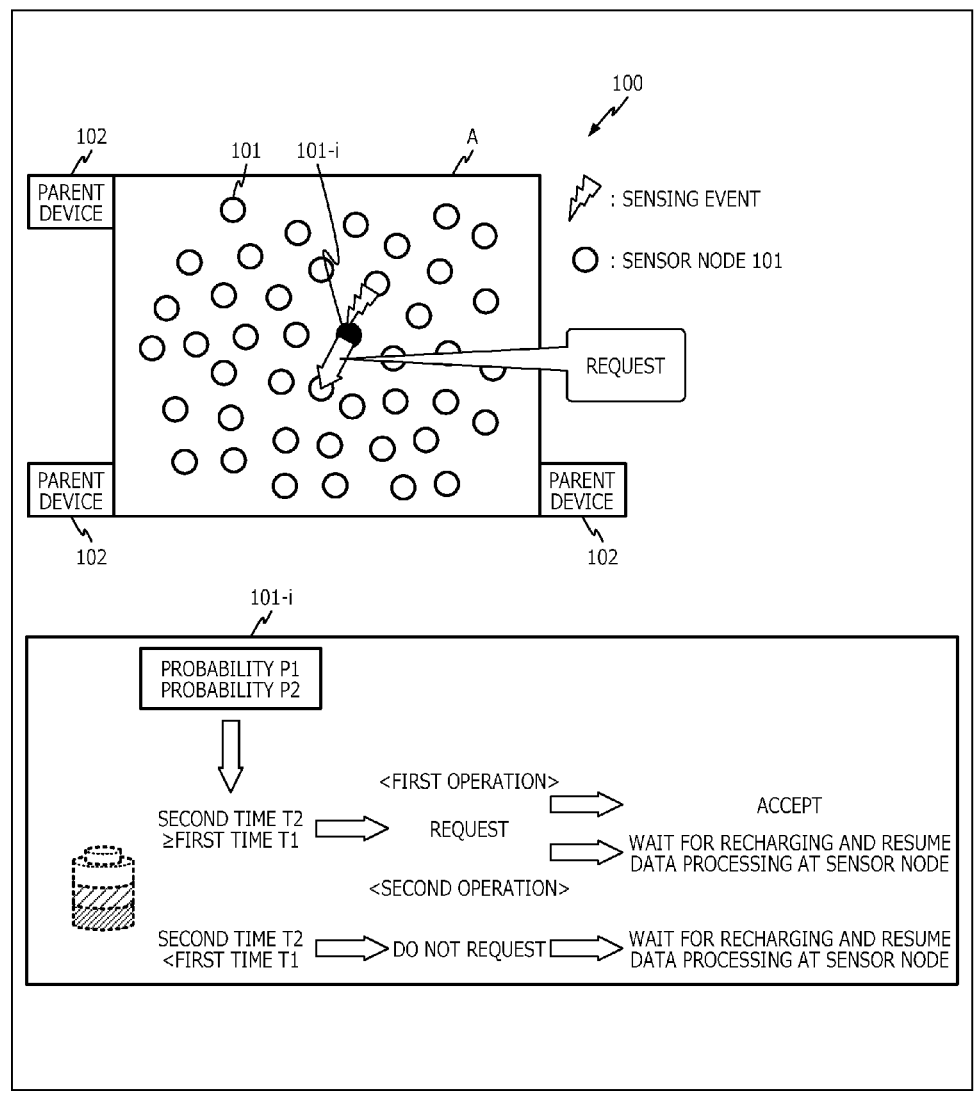
FIG. 1 is a diagram depicting one example of operation of a sensor node according to the present invention.

FIG. 1 is a diagram depicting one example of operation of a sensor node according to the present invention. A sensor network system 100 has sensor nodes 101 that are first communications apparatuses arranged in a given area A, and a parent device 102 that is a second communications apparatus. As depicted in FIG. 1, the parent device 102 may be provided in plural. Each of the sensor nodes 101 has a harvester capable of generating electrical power and a battery that stores the electrical power generated by the harvester. In place of the battery, the sensor nodes 101 may have a capacitor that can store the electrical power generated by the harvester. When the amount of electrical power that can be stored by the battery and/or the amount of electrical power that can be generated by the harvester is low, the sensor node 101 has to suspend execution of data processing.

Thus, when execution of the data processing is suspended, the sensor node 101-*i* requests another sensor node 101 to execute the data processing, or waits for recharging and resumes the data processing at the sensor node 101-*i*. If another sensor node 101 accepts the request, resumption of the suspended data processing by the other sensor node 101 occurs sooner than resumption of the data processing by the sensor node 101-*i* after waiting for recharging. On the other hand, if the other sensor node 101 cannot accept the request, the sensor node 101-*i* waits for recharging and resumes the data processing thereafter and therefore, resumption of the data processing by the sensor node 101-*i* after waiting for recharging occurs sooner without making a request to another sensor node 101. Thus, the sensor node 101-*i* is assumed to be able to execute a first operation of attempting to request another sensor node 101 to execute the data processing, and a second operation of waiting for recharging and executing the data processing without requesting another sensor node 101.

More specifically, under the first operation, the sensor node 101-*i* transmits to another sensor node 101, a request signal requesting execution of the data processing and if the request is not accepted by the other sensor node 101, the sensor node 101-*i* starts executing the data processing after electrical power enabling completion of the data processing has been charged. More specifically, under the second operation, without transmitting a request signal to another sensor node 101, the sensor node 101-*i* starts executing the data processing after electrical power enabling completion of the data processing has been charged.

Here, among the first operation and the second operation, the sensor node 101-*i* executes the operation for which the time until starting is shorter. For example, based on the probability that the other sensor node 101 will accept the execution request for the data processing, the sensor node 101-*i* obtains an expected value of a first time T1, which is the time that elapses until the start of execution of the data processing in a case of the first operation being executed. Since either the sensor node 101-*i* or the other sensor node 101 executes the data processing in the case of the first operation being executed, the expected value of the first time T1 is derived based on the probability of the other sensor node 101 accepting the request. For example, the expected value of the first time T1 may be determined by equations (1) to (3). Here, the sensor node 101-*i* is assumed to obtain the expected value of the first time T1 by calculating equations (1) to (3).

$$T3=0 \qquad (1)$$

$$T4=\min(T_{int} \times m) > D_{Size} \times (P_{MCU}+P_{Send})/P_{harvestor} \qquad (2)$$

$$T1=P1 \times T3+P2 \times T4 \qquad (3)$$

A third time T3 is the time that elapses until another sensor node 101 starts executing the data processing in a case of the data processing being suspended and another sensor node 101 among the sensor nodes 101, exclusive the sensor node 101-*i*, being requested to execute the data processing. In equation (1), although the third time T3 is 0, for example, the third time T3 may be the average time that elapses until receipt of the execution request and an acceptance signal.

A fourth time T4 is the time consumed for the sensor node 101-*i* to start executing the data processing after waiting for charging and to start transmitting execution results in a case of the execution request not being accepted despite requesting the other sensor nodes 101 for execution. Equation (2) will be described. $T_{int}$ is an event occurrence interval; m is an integer of 1 or greater. $D_{Size}$ is the data size of the data processing. $P_{MCU}$ [mW/Byte] is power consumption per unit data, for executing the data processing. $P_{harvestor}$ [mW] is the electrical power per unit time, obtained from the harvester. $P_{Send}$ is the power consumption per unit data, used to transmit data by RF. More specifically, the fourth time T4 is the smallest value among "$T_{int} \times m$", which is greater than "$D_{Size} \times (P_{MCU}+P_{Send})/P_{harvestor}$".

As indicated by equation (3), the expected value of the first time T1 is the sum of the product of a probability P1 and the obtained third time T3, and the product of a probability P2 and the obtained fourth time T4. The probability P1 is the probability that another sensor node 101 can accept the request; and the probability P2 is the probability that another sensor node 101 cannot accept the request. The probability P1 and the probability P2 are determined, for example, based on past request results. For example, the sensor node 101 may derive the probability P1 and the probability P2 based on the number of requests accepted out of 10 requests to the other sensor node 101.

The sensor node 101 obtains the second time T2, which is the time that elapses until the sensor node 101 starts executing the data processing after electrical power enabling the execution of the data processing to be completed is charged, in the case of the second operation being executed by the sensor node 101. For example, the second time T2 is represented by equation (4) below.

$$T2 = T_{int} \times n > D_{Size} \times P_{MCU}/P_{harvestor} \qquad (4)$$

n is an integer of 1 or greater. More specifically, T2 is the smallest value among "$T_{int} \times n$", which is greater than "$D_{Size} \times P_{MCU}/P_{harvestor}$".

The sensor node 101 compares the expected value of the first time T1 and the second time T2. If during execution of the data processing, the remaining charged electrical power becomes less than a threshold, the sensor node 101 executes either the first operation or the second operation, based on the comparison result. For example, if the expected value of the first time T1 is less than the second time T2, the sensor node 101 executes the first operation. For example, if the second time T2 is less than the expected value of the first time T1, the sensor node 101 executes the second operation. Here, if the first time T1 and the second time T2 are the same value, although any one of the first operation and the second operation may be executed, in the example depicted in FIG. 1, the sensor node 101 performs the first operation. The threshold may be a fixed value or may be an amount of electrical power based on the comparison result. An example of the case of the threshold being an amount of electrical power based on the comparison result will be described herein.

According to FIG. 1, by executing the operation for which the time until the execution of the data processing is started is shorter, the time until the execution of the data processing is completed can be reduced. Therefore, an execution result can be transmitted to the parent device 102 sooner. For example, in the sensor network system 100, information is communicated to a user terminal, a server, etc., via the parent device 102. For example, when the sensor node 101 detects an abnormality such as shaking or wall distortion consequent to an earthquake, if execution results can be transmitted to the parent device 102 sooner, the user terminal and the like can be notified of the abnormality sooner, via the parent device 102.

Figure 2:
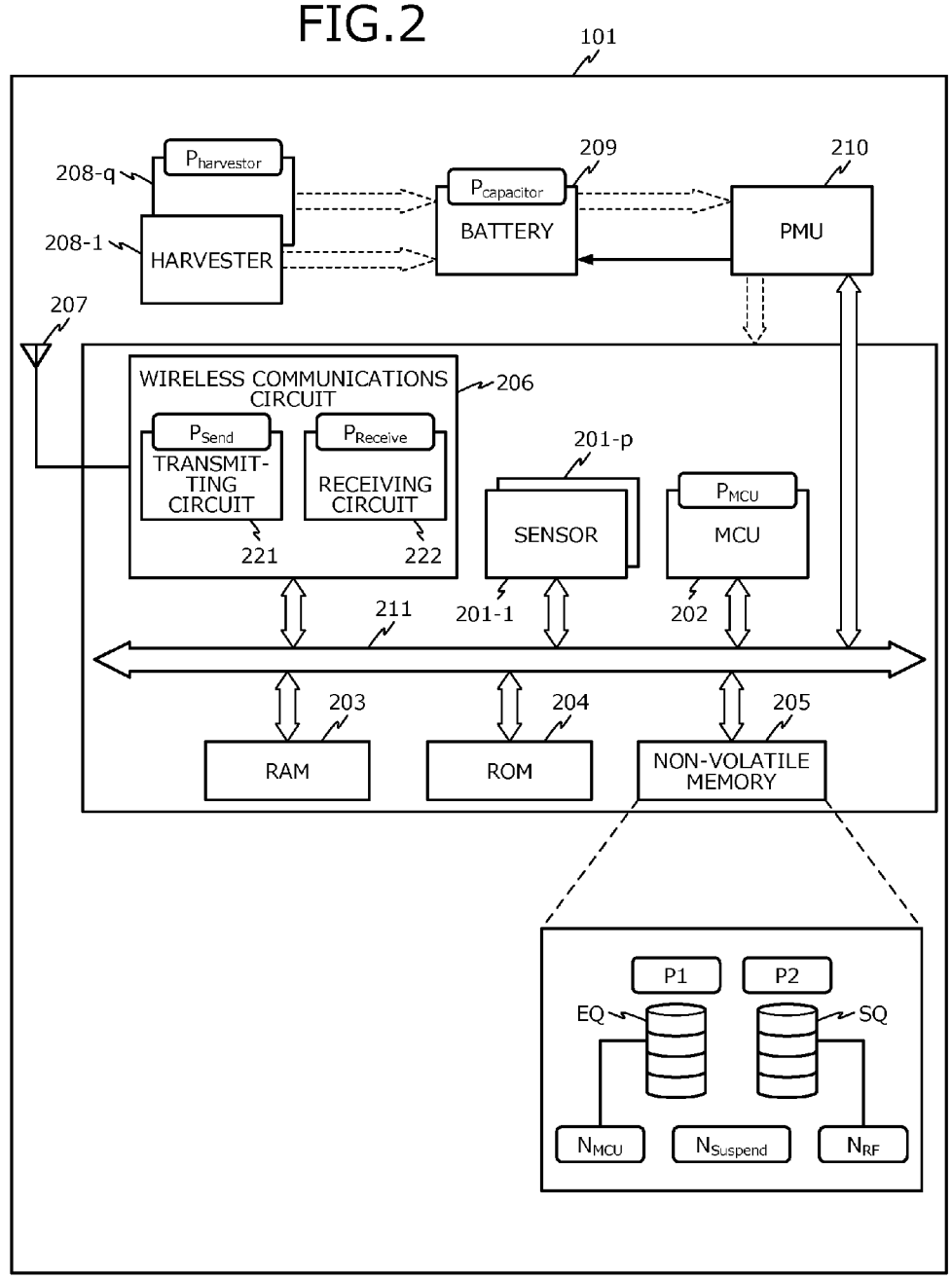
FIG. 2 is a block diagram depicting an example of a hardware configuration of the sensor node.

FIG. 2 is a block diagram depicting an example of a hardware configuration of the sensor node. The sensor node 101 has a sensor 201, a power management unit (PMU) 210, a wireless communications circuit 206, an antenna 207, and a microprocessor (hereinafter, "micro control unit" (MCU)) 202. The sensor node 101 has random access memory (RAM) 203, read-only memory (ROM) 204, and nonvolatile memory 205. The sensor node 101 has an internal bus 211 that connects the sensor 201, the wireless communications circuit 206, the MCU 202, the RAM 203, the ROM 204, and the nonvolatile memory 205. The sensor node 101 further has a harvester 208 and a battery 209.

The sensor 201 detects a given displacement occurring at the installation site. The sensor 201, for example, may be a piezoelectric element that detects pressure at the installation site, an element that detects temperature, a photoelectric element that detects light, and the like. As depicted in FIG. 2, the sensor 201 may be provided in plural, where each of the sensors 201 has a different function. In the example depicted in FIG. 2, p sensors 201, the sensor 201-1 to the sensor 201-p, are provided.

The antenna 207 transmits and receives radio waves wirelessly communicated with the parent device 102. The wireless communications circuit 206 (RF) has a receiving circuit 222 and a transmitting circuit 221. The receiving circuit 222 outputs, as received signals, received wireless radio waves. The power consumption per unit data consumed by the receiving circuit 222 for reception processing is assumed to be $P_{Receive}$. The transmitting circuit 221 transmits, as wireless radio waves, transmission signals, via the antenna 207. As described above, the power consumption per unit data consumed by the transmitting circuit 221 for transmission processing is assumed to be $P_{Send}$.

The MCU 202 processes data related to detection by the sensor 201. As described above, $P_{MCU}$ is the power consumption per unit data by the MCU 202 for data processing. The RAM 203 stores transient data of the processing by the MCU 202. The ROM 204 stores programs, etc. executed by the MCU 202.

The nonvolatile memory 205 stores data when, for example, the power supply is lost. For example, the nonvolatile memory 205 stores the probability P1 and the probability P2 described above. For example, the nonvolatile memory 205 stores a data processing wait queue EQ and a transmission wait queue SQ. The MCU 202 executes in the order in which execution data is registered in the data processing wait queue EQ, data processing indicated by the execution data. However, execution data for which data processing has been suspended is assumed to be registered at the head of the data processing wait queue EQ. As a result, after waiting for the charging of electrical power, the MCU 202 can resume continuing the suspended data processing. Therefore, the MCU 202 can execute data processing in the order in which events occur. The transmitting circuit 221 transmits transmission data in order of registration to the transmission wait queue SQ.

For example, the nonvolatile memory 205 stores $N_{MCU}$, which is the number of execution data awaiting execution in the data processing wait queue EQ. For example, the nonvolatile memory 205 stores $N_{Suspend}$, which indicates whether data processing that has been suspended is present and $N_{RF}$, which is the number of transmission data awaiting transmission in the transmission wait queue SQ.

The harvester 208 generates electrical power based on energy changes, such as changes in light, vibration, temperature, wireless radio waves (received radio waves), etc., occurring in the external environment of the installation site of the sensor node 101. The harvester 208 may generate electrical power according to the displacement detected by the sensor 201. The battery 209 stores the electrical power generated by the harvester 208. In other words, the sensor node 101 does not need a secondary battery or an external power source, and can generate internally, the electrical power necessary for operation. Here, the stored electrical power of the battery 209 is assumed to be $P_{capacitor}$ [mW] The harvester 208 is be provided in plural and in the example depicted in FIG. 2, q harvesters 208, the harvester 208-1 to the harvester 208-q are provided.

The PMU 210 controls the supply of the electrical power stored by the battery 209, as a driving power source of the components of the sensor node 101. For example, when the sensor 201 performs sensing processing, the PMU 210 supplies electrical power to the MCU 202 to invoke the MCU 202. Further, if the MCU 202 is not performing any processing, the PMU 210 ceases the power supply to the MCU 202. Here, the electrical power used by the PMU 210 to perform control is assumed to be $P_{PMU}$.

Figure 3:
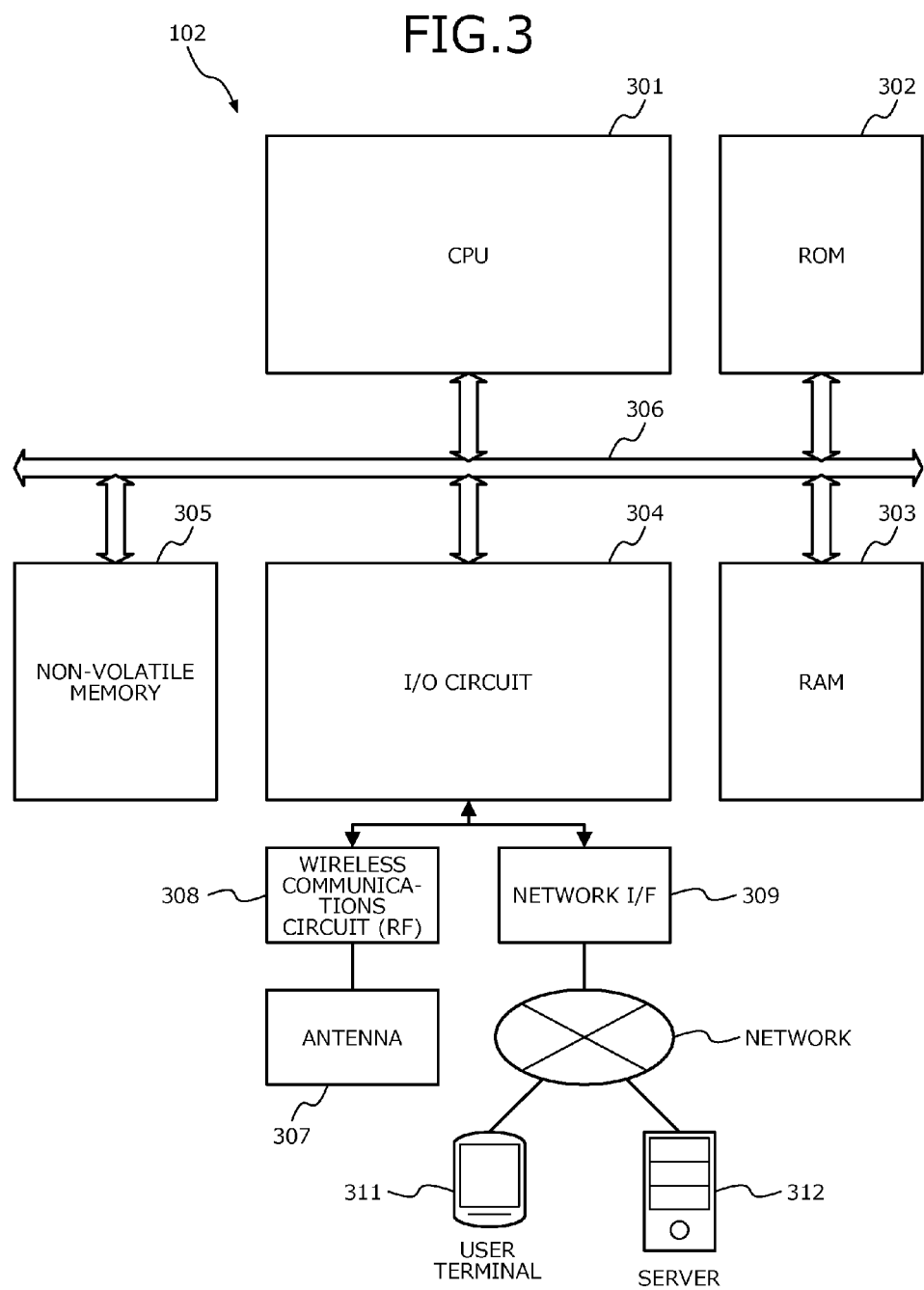
FIG. 3 is a block diagram depicting an example of a hardware configuration of a parent device.

FIG. 3 is a block diagram depicting an example of a hardware configuration of the parent device. The parent device 102 operates on an external power supply, unlike the sensor nodes 101. The parent device 102 has a central processing unit (CPU) 301, which is more sophisticated processor than the MCU 202 of the sensor node 101, and large-capacity ROM 302 and RAM 303. The parent device 102 has an interface (input/output (I/O)) circuit 304, and a bus 306 that connects the CPU 301, the ROM 302, the RAM 303, the I/O circuit 304, and nonvolatile memory 305.

Further, an antenna 307 and a wireless communications circuit (radio frequency (RF)) 308, and a network I/F 309 are connected to the I/O circuit 304. As a result, the parent device 102 can wirelessly communicate with the sensor node 101, via the antenna 307 and the wireless communications circuit 308. The parent device 102 can further communicate with external apparatuses, such as a user terminal 311 and a server 312 through a network NET such as the Internet, via the network I/F 309, by a TCP/IP protocol process.

Figure 4:
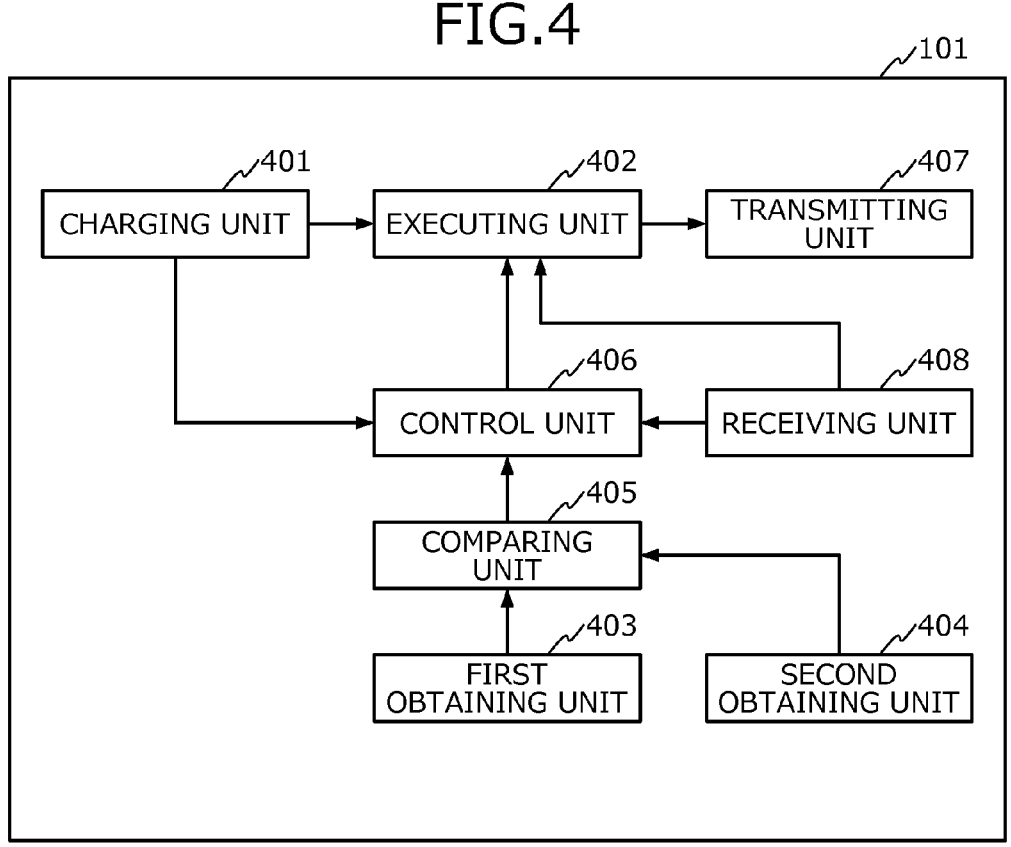
FIG. 4 is a block diagram depicting an example of a functional configuration of the sensor node.

FIG. 4 is a block diagram depicting an example of a functional configuration of the sensor node. The sensor node 101 has a charging unit 401, an executing unit 402, a first obtaining unit 403, a second obtaining unit 404, a comparing unit 405, a control unit 406, a transmitting unit 407, and a receiving unit 408. For example, the charging unit 401 may be realized by the harvester 208 and the battery 209 described above. Processing by the first obtaining unit 403, the second obtaining unit 404, and the comparing unit 405, for example, is realized by the PMU 210. For example, processing by the transmitting unit 407 is realized by the transmitting circuit 221. For example, processing by the receiving unit 408 is realized by the receiving circuit 222. For example, processing by the executing unit 402 and the control unit 406 is realized by the MCU 202 and the PMU 210.

The control unit 406, after the occurrence of a sensing event, registers into the data processing wait queue EQ, execution data of the data processing corresponding to the sensing event. The control unit 406 causes the transmitting unit 407 to transmit transmission data registered in transmission wait queue SQ. In the order of registration, the transmitting unit 407 transmits the transmission data registered in the transmission wait queue SQ.

The electrical power consumed for transmitting execution results is greater than the electrical power consumed for executing the data processing. If the data processing is executed when the remaining charged electrical power is less than the electrical power consumed for transmitting the execution results and greater than the electrical power consumed for executing the data processing, the transmission queuing count of the execution results increases. Thus, even if execution data is registered in the data processing wait queue EQ, the control unit 406 causes the executing unit 402 to execute the data processing related to the execution data registered in the data processing wait queue EQ, after the transmission wait queue SQ becomes empty. As a result, since the transmission of execution results is given priority, the execution results can be transmitted to the parent device 102 sooner.

When no transmission data is registered in the transmission wait queue SQ and execution data is registered in the data processing wait queue EQ, the first obtaining unit 403 obtains the expected value of the first time T1 for the execution data registered at the head of the data processing wait queue EQ. The expected value of the first time T1 is the expected value of the time that elapses until the executing unit 402 or another communications apparatus starts executing the data processing, in a case where the first operation is executed, based on the probability that the request for execution of the data processing will be accepted by another sensor node 101. The expected value of the first time T1, for example, is derived by equations (1) to (3) described above.

The second obtaining unit 404 obtains the second time T2 for the execution data registered at the head of the data processing wait queue EQ. The second time T2 is the time that elapses until the executing unit 402 starts executing the data processing after electrical power enabling the execution of the data processing to be completed is charged by the charging unit 401, in a case where the second operation is executed. The second time T2 is derived by equation (4) described above.

The comparing unit 405 compares the expected value of the first time T1 obtained by the first obtaining unit 403 and the second time T2 obtained by the second obtaining unit 404, before the executing unit 402 starts executing the data processing. For example, the comparison result may be stored by setting a mode, which is a processing mode. For example, if the expected value of the first time T1 is less than the second time T2, the comparing unit 405 sets the mode to 1; and if the second time T2 is less than the expected value of the first time T1, the comparing unit 405 sets the mode to 2. As described above, if the first time T1 and the second time T2 are the same, any one of the first operation and the second operation may be executed and therefore, when the first time T1 and the second time T2 are the same, the comparing unit 405 may set the mode to either 1 or 2. However, in this example, the comparing unit 405 is assumed to set the mode to 1. Further, the comparing unit 405 compares the first time T1 and the second time T2, before the executing unit 402 starts executing the data processing. After a threshold $P_{limit}$ has been fixed, the executing unit 402 starts executing the data processing.

The executing unit 402 uses the electrical power charged by the charging unit 401 and executes data processing corresponding to the event that occurs at the sensor node 101 of the executing unit 402. If the remaining charged electrical power becomes less than the threshold $P_{limit}$ during execution of the data processing by the executing unit 402, the control unit 406 causes the executing unit 402 to execute any one of the first operation and the second operation, based on the comparison result obtained by the comparing unit 405. The remaining charged electrical power is the amount of stored charge of the battery 209. More specifically, if the mode is 1, the control unit 406 causes the executing unit 402 execute the first operation and if the mode is 2, the control unit 406 causes the executing unit 402 to execute the second operation.

Figure 5:
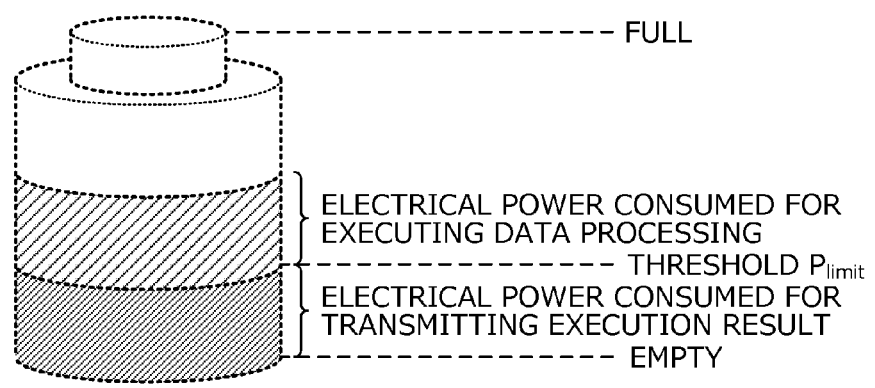
FIG. 5 is a diagram depicting a threshold $P_{limit}$ in a case when execution is not requested of another sensor node.

FIG. 5 is a diagram depicting the threshold $P_{limit}$ in a case when execution is not requested of another sensor node. For example, if the comparing unit 405 determines that the second time T2 is less than the expected value of the first time T1, the threshold $P_{limit}$ is a value based on the amount of charged electrical power consumed for transmitting execution results. The control unit 406 causes the data processing to be executed by the executing unit 402 until execution of the data processing is completed or until the remaining charged electrical power becomes less than the threshold $P_{limit}$. Here, the threshold $P_{limit}$ is represented by equation (5) below.

$$P_{limit} = D_{Size} \times P_{Send} + \alpha \qquad (5)$$

The threshold $P_{limit}$ may have some margin α. The threshold $P_{limit}$, for example, is calculated by the control unit 406 after the comparison by the comparing unit 405. If the remaining charged electrical power becomes less than a threshold that is based on the total value, the control unit 406 causes the data processing executed by the executing unit 402 to be suspended. The control unit 406 puts the executing unit 402 in a sleep state and waits for charging by the charging unit 401. If a new event occurs and electrical power enabling completion of the suspended data processing has been charged by the charging unit 401, the control unit 406 causes the suspended data processing to be resumed by the executing unit 402.

Figure 6:
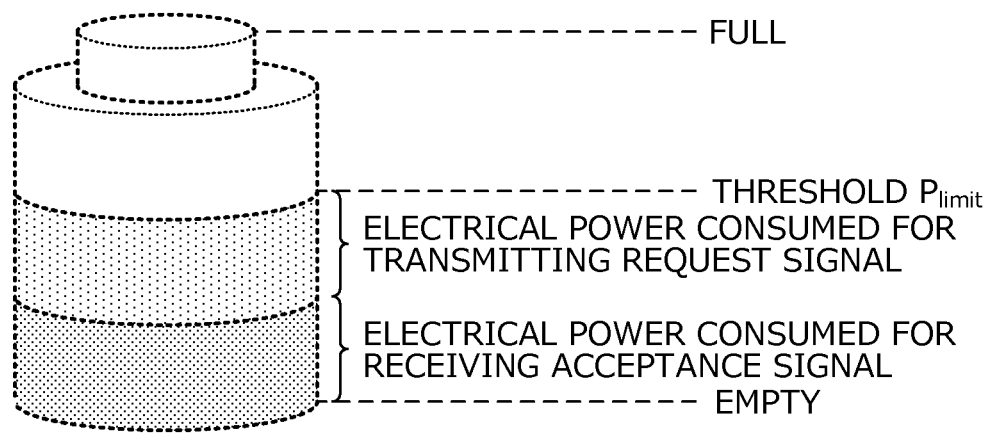
FIG. 6 is a diagram depicting the threshold $P_{limit}$ in a case when execution is requested of another sensor node.
Figure 7:
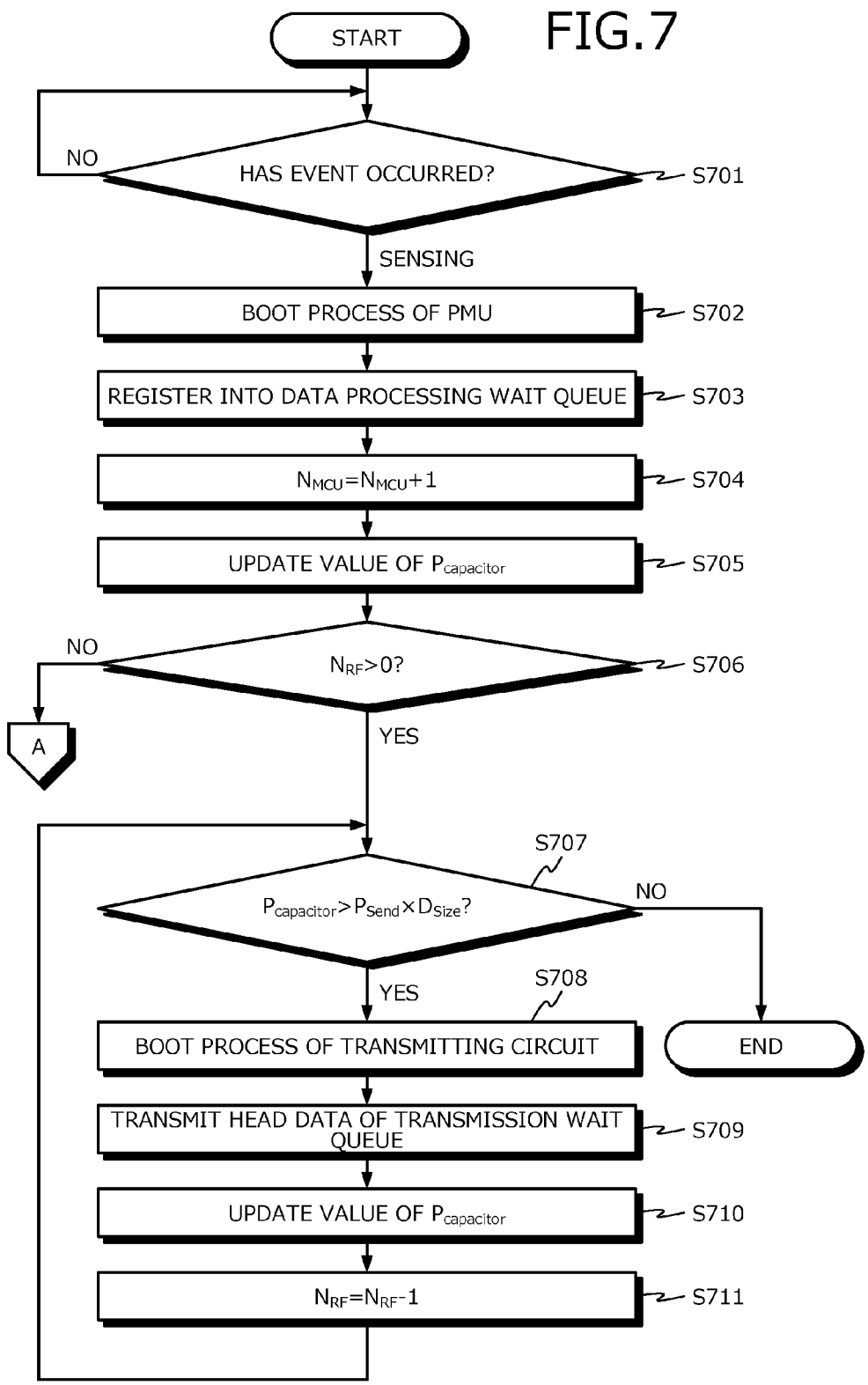
FIG. 7 is a flowchart (part 1) of one example of a procedure of a process performed by the sensor node.
Figure 8:
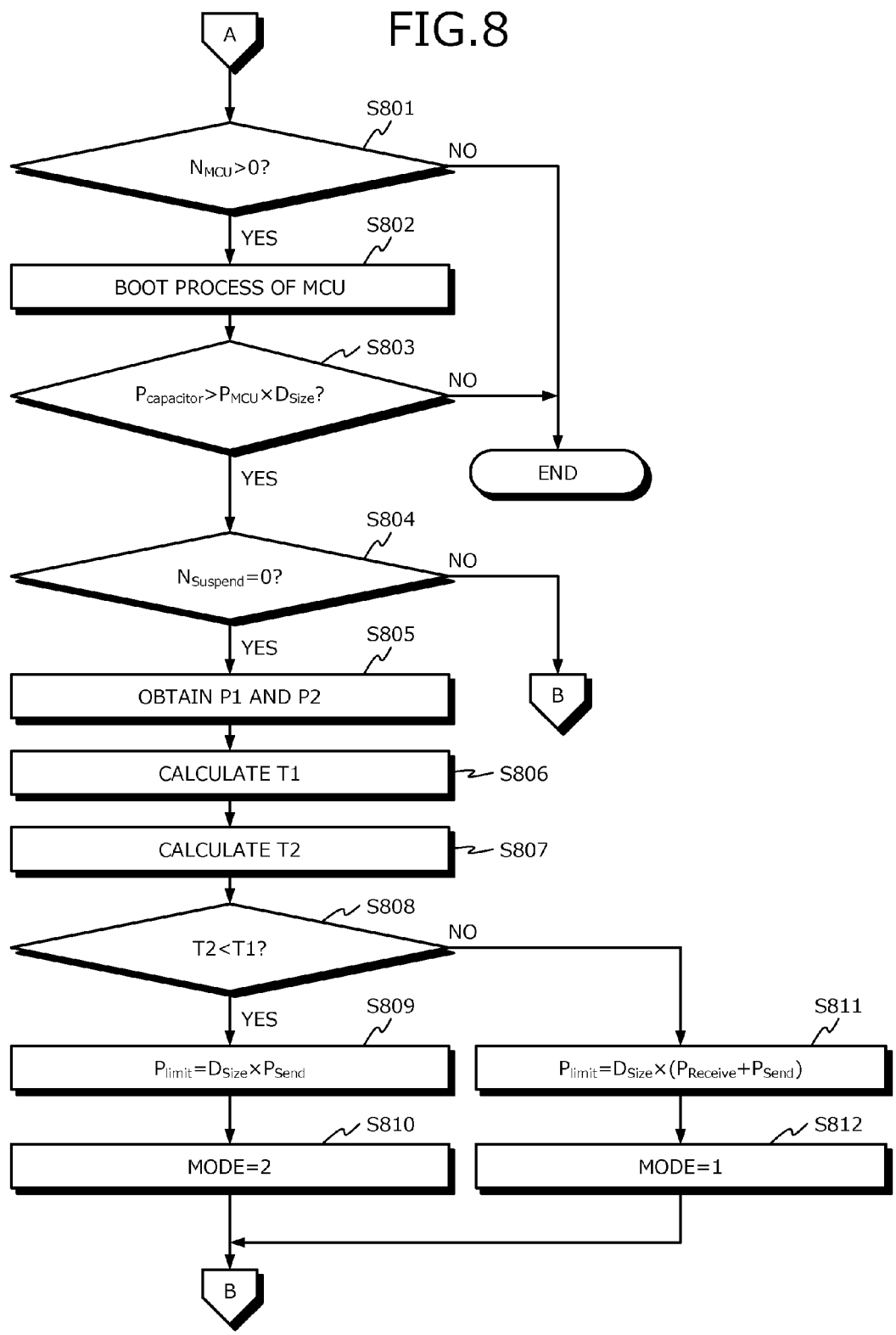
FIG. 8 is a flowchart (part 2) of one example of a procedure of a process performed by the sensor node.
Figure 9:
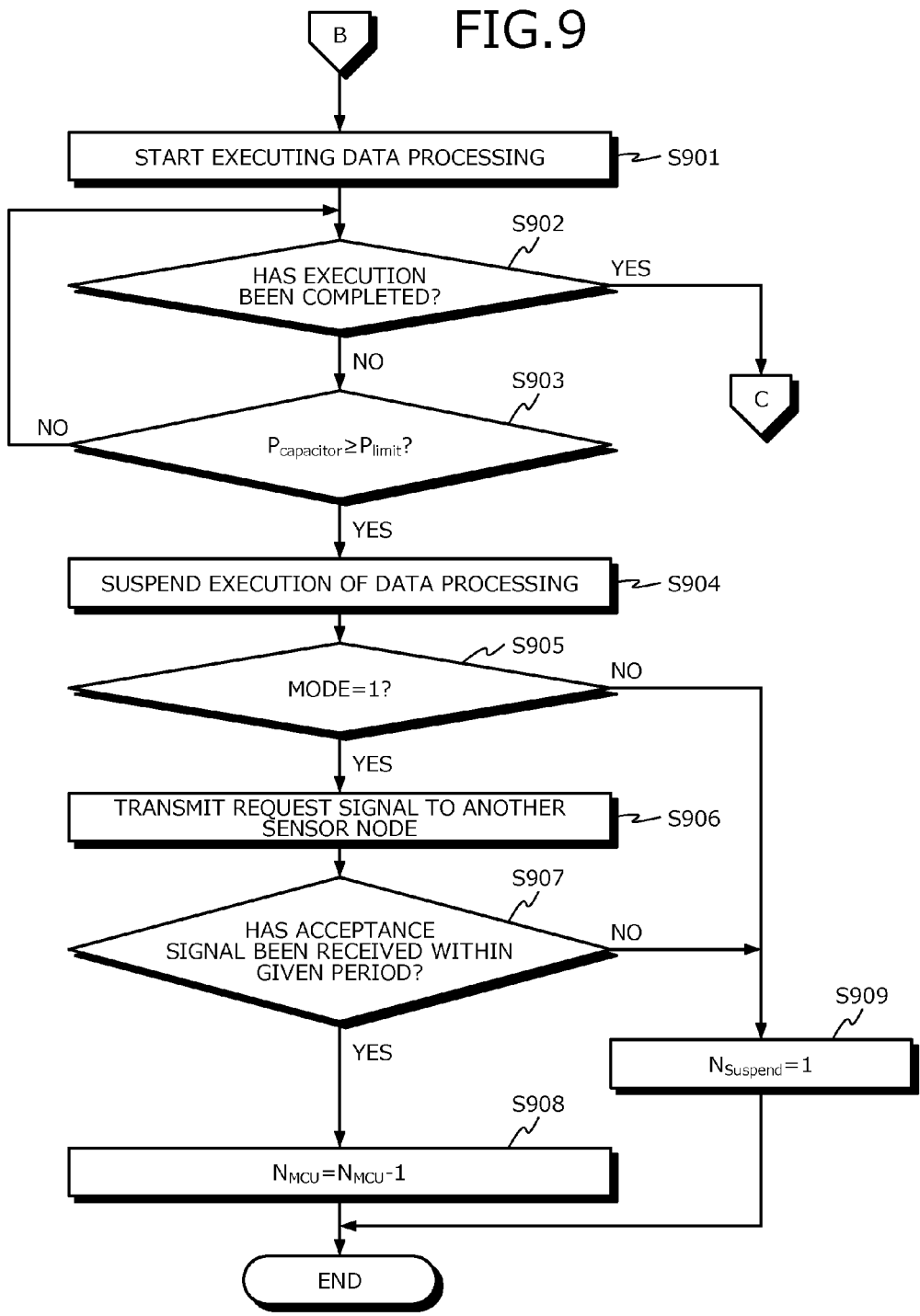
FIG. 9 is a flowchart (part 3) of one example of a procedure of a process performed by the sensor node.
Figure 10:
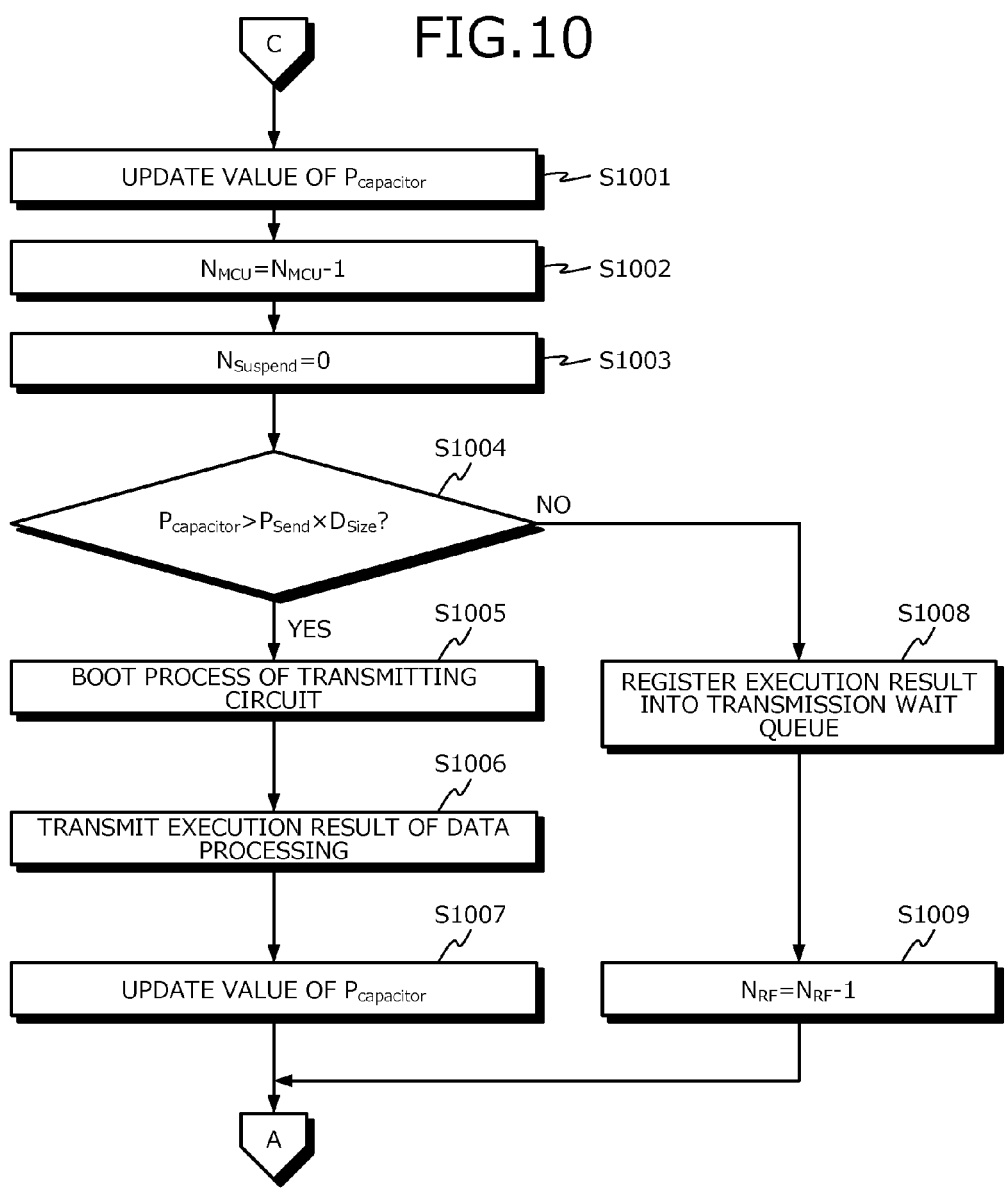
FIG. 10 is a flowchart (part 4) of one example of a procedure of a process performed by the sensor node.

FIG. 6 is a diagram depicting the threshold $P_{limit}$ in a case when execution is requested of another sensor node. For example, if the comparing unit 405 determines that the second time T2 is the expected value of the first time T1 or greater, the threshold $P_{limit}$ is a value based on the total value of the electrical power consumed for transmitting a request signal and the electrical power consumed for receiving an acceptance signal indicating acceptance of the execution of the data processing indicated by the request signal. The control unit 406 causes the data processing to be executed by the executing unit 402 until execution of the data processing is completed, or until the remaining charged electrical power becomes less than the threshold $P_{limit}$. Here, the threshold $P_{limit}$ is represented by equation (6) below.

$$P_{limit}=D_{Size} \times (P_{Receive}+P_{Send})+\alpha \tag{6}$$

The threshold $P_{limit}$ may have some margin α. The threshold $P_{limit}$, for example, is calculated by the control unit 406 after the comparison by the comparing unit 405. If the remaining charged electrical power becomes less than the threshold $P_{limit}$, which is based on the total value, the control unit 406 causes the execution of the data processing by the executing unit 402 to be suspended. The control unit 406 causes the transmitting unit 407 to transmit a request signal and causes the receiving unit 408 to receive an acceptance signal indicating acceptance of the data processing.

If an acceptance signal indicating the acceptance of the data processing is received by the receiving unit 408, the control unit 406 deletes from the data processing wait queue EQ, execution data related to the data processing for which execution has been suspended. On the other hand, if no acceptance signal indicating acceptance of the data processing is received by the receiving unit 408 despite a given period elapsing since the transmission of the request signal, the control unit 406 puts the executing unit 402 in the sleep state and waits for charging by the charging unit 401. If a new event occurs and electrical power enabling completion of the suspended data processing has been charged by the charging unit 401, the control unit 406 causes the suspended data processing to be resumed by the executing unit 402.

FIGS. 7, 8, 9, and 10 are flowcharts of one example of a procedure of a process performed by the sensor node. The sensor node 101 determines whether an event has occurred (step S701). If no event has occurred (step S701: NO), the sensor node 101 returns to step S701. If a sensing event has occurred (step S701: sensing), the sensor node 101 performs a boot process of the PMU 210 (step S702).

The sensor node 101, via the PMU 21, registers into the data processing wait queue EQ, execution data of the data processing corresponding to the event that occurred (step S703), and sets "$N_{MCU}=N_{MCU}+1$" (step S704). The sensor node 101, via the PMU 210, updates the value of $P_{capacitor}$ (step S705), and determines whether "$N_{RF}>0$" is true (step S706). If "$N_{RF}>0$" is true (step S706: YES), the sensor node 101, via the PMU 210, determines whether "$P_{capacitor}>P_{Send} \times D_{Size}$" is true (step S707). Here, $D_{Size}$ is the data size of the head data of the data processing wait queue EQ.

If "$P_{capacitor}>P_{Send} \times D_{Size}$" is not true (step S707: NO), the remaining electrical power is insufficient for executing the data processing and therefore, the sensor node 101 ends the series of operations. If "$P_{capacitor}>P_{Send} \times D_{Size}$" is true (step S707: YES), the sensor node 101, via the PMU 210, performs a boot process of the transmitting circuit 221 (step S708). The sensor node 101, via the transmitting circuit 221, transmits the head data of the transmission wait queue SQ (step S709). The sensor node 101, via the PMU 210, updates the value of $P_{capacitor}$ (step S710), sets $N_{RF}=N_{RF}-1$ (step S711), and returns to step S707.

If "$N_{RF}>0$" is not true (step S706: NO), the sensor node 101 determines whether "$N_{MCU}>0$" is true (step S801). If "$N_{MCU}>0$" is not true (step S801: NO), no data processing to be executed is present and therefore, the sensor node 101 ends the series of operations.

On the other hand, if "$N_{MCU}>0$" is true (step S801: YES), the sensor node 101, via the PMU 210, executes a boot process of the MCU 202 (step S802). The sensor node 101, via the MCU 202, determines whether "$P_{capacitor}>P_{MCU} \times D_{Size}$" is true (step S803). Here, $D_{Size}$ is the data size of the head data of the data processing wait queue EQ. If "$P_{capacitor}>P_{MCU} \times D_{Size}$" is not true (step S803: NO), the sensor node 101 ends the series of operations. If "$P_{capacitor}>P_{MCU} \times D_{Size}$" is true (step S803: YES), the sensor node 101, via the MCU 202, determines whether "$N_{Suspend}=0$" is true (step S804).

If "$N_{Suspend}=0$" is not true (step S804: NO), the data processing for the head data of the data processing wait queue EQ is data processing that has been suspended and therefore, the sensor node 101 transitions to step S901. If "$N_{Suspend}=0$" is true (step S804: YES), the sensor node 101, via the MCU 202, obtains P1 and P2 (step S805), and calculates T1 based on P1 and P2 as indicated by equations (1) to (3) (step S806). The sensor node 101, via the MCU 202, calculates T2 as indicated by equation (4) (step S807).

The sensor node 101, via the MCU 202, determines whether T2<T1 is true (step S808). If T2<T1 is true (step S808: YES), the sensor node 101, via the MCU 202, sets "$P_{limit}=D_{Size} \times P_{Send}$" (step S809), and further sets mode=2 (step S810). If T2<T1 is not true (step S808: NO), the sensor node 101, via the MCU 202, sets "$P_{limit}=D_{Size} \times (P_{Receive}+P_{Send})$" (step S811), and further sets "mode=1" (step S812). As a result, among the first operation and the second operation, the operation for which the time that elapses until the start of execution is shorter is executed. If T2 and T1 are the same value, although any one of the first operation and the second operation may be performed, here, the first operation is assumed to be performed. At step S809 and at step S811, the threshold $P_{limit}$ may have some margin α.

Subsequent to step S810 or step S812, the sensor node 101 starts executing the data processing indicated by the head execution data of the data processing wait queue EQ (step S901). The sensor node 101, via the MCU 202, determines whether execution has been completed (step S902). If execution has not been completed (step S902: NO), the sensor node 101, via the MCU 202, determines whether "$P_{capacitor} \geq P_{limit}$" is true (step S903). If "$P_{capacitor} \geq P_{limit}$" is not true (step S903: NO), the sensor node 101 returns to step S902. By step S902 and step S903, the sensor node 101 can execute the data processing until the execution of the data processing is completed, or until the remaining charged electrical power become less than the threshold $P_{limit}$.

If "$P_{capacitor} \geq P_{limit}$" is true (step S903: YES), the sensor node 101, via the MCU 202, suspends the execution of the data processing (step S904), and determines whether "mode=1" is true (step S905). If "mode=1" is true (step S905: YES), the first operation is executed and therefore, the sensor node 101, via the transmitting circuit 221, transmits a request signal to another sensor node 101 (step S906). For example, the request signal here includes, among the data processing for which execution has been suspended, execution data related to the data processing that has not been completed, execution results of the completed data processing, and identification information of the sensor node 101 indicating the sensor node 101 as the source of the request.

The sensor node 101 determines whether an acceptance signal indicating acceptance of the execution of the data processing indicated by the transmitted request signal has been received by the receiving circuit 222 within a given period (step S907). If an acceptance signal has been received (step S907: YES), the sensor node 101, via the MCU 202, sets "$N_{MCU}=N_{MCU}-1$" (step S908), and ends the series of operations.

If "mode=1" is not true (step S905: NO), or if no acceptance signal is received within the given period (step S907: NO), the sensor node 101 waits for charging and resumes execution of the suspended data processing. Therefore, the sensor node 101, via the MCU 202, sets "$N_{Suspend}=1$" (step S909), and ends the series of operations.

On the other hand, if execution has been completed (step S902: YES), the sensor node 101, via the PMU 210, updates the value of $P_{capacitor}$ (step S1001). The sensor node 101, via the MCU 202, sets "$N_{MCU}=N_{MCU}-1$" (step S1002), and sets "$N_{Suspend}=0$" (step S1003). The sensor node 101 determines whether "$P_{capacitor}>P_{Send} \times D_{Size}$" is true (step S1004). If "$P_{capacitor}>P_{Send} \times D_{Size}$" is true (step S1004: YES), the sensor node 101, via the PMU 210, executes the boot process for the transmitting circuit 221 (step S1005), and via the transmitting circuit 221, transmits execution results of the data processing (step S1006). The sensor node 101, via the PMU 210, updates the value of $P_{capacitor}$ (step S1007), and returns to step S801.

If "$P_{capacitor}>P_{Send} \times D_{Size}$" is not true (step S1004: NO), the sensor node 101, via the MCU 202, registers the execution results into the transmission wait queue SQ (step S1008), sets "$N_{RF}=N_{RF}-1$" (step S1009), and returns to step S801.

Figure 11:
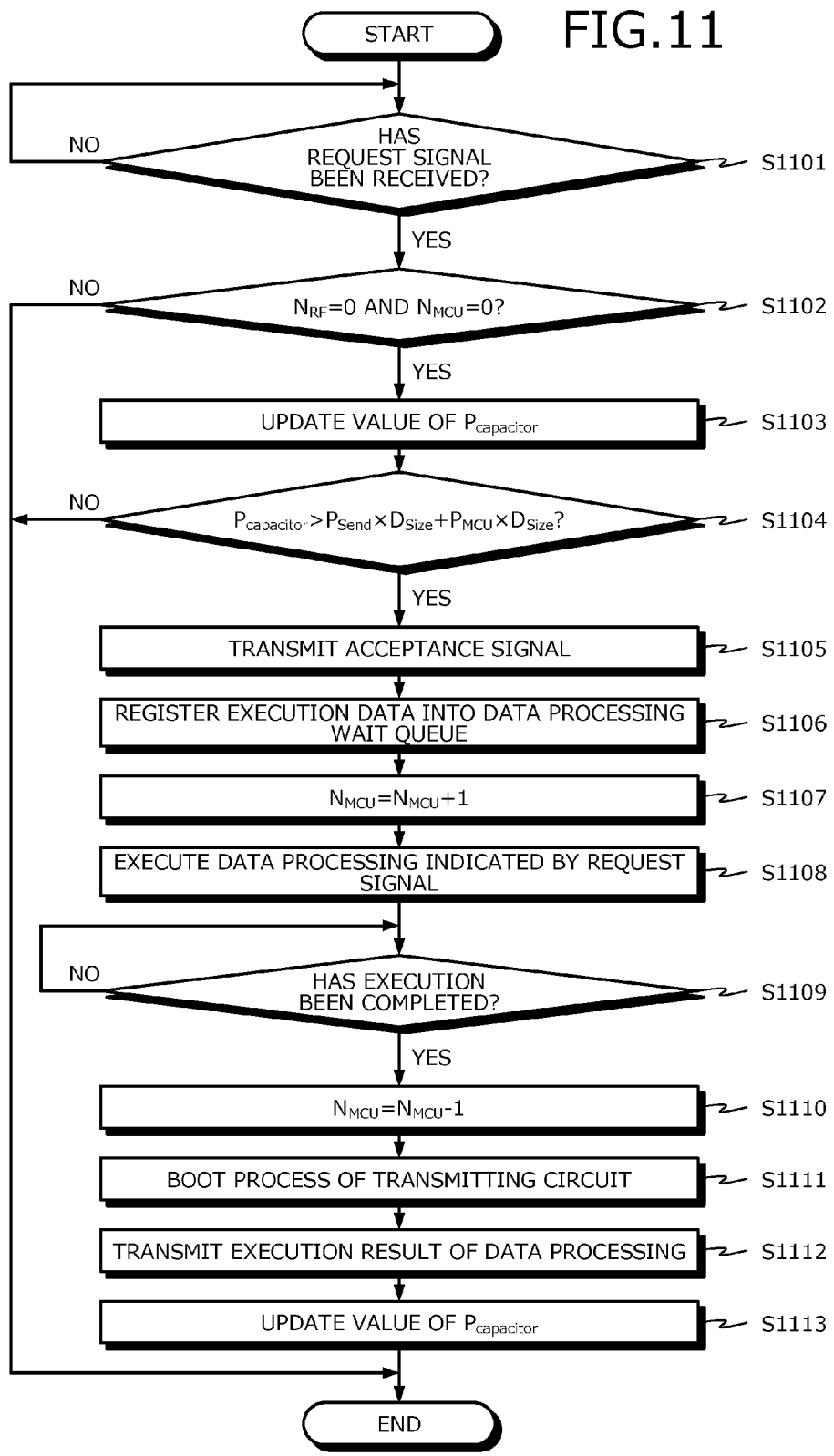
FIG. 11 is a flowchart depicting one example of a procedure of a process performed by the sensor node when a request signal is received.

FIG. 11 is a flowchart depicting one example of a procedure of a process performed by the sensor node when a request signal is received. The sensor node 101 determines whether a request signal has been received by the receiving circuit 222 (step S1101). If no request signal has been received (step S1101: NO), the sensor node 101 returns to step S1101. If a request signal has been received (step S1101: YES), the sensor node 101, via the MCU 202, determines whether "$N_{RF}=0$" and "$N_{MCU}=0$" are true (step S1102). If "$N_{RF}=0$" and "$N_{MCU}=0$" are not true (step S1102: NO), a process that is to be performed at the sensor node 101 is present and therefore, the sensor node 101 does not accept the request from the other sensor node 101, ending the series of operations.

On the other hand, if "$N_{RF}=0$" and "$N_{MCU}=0$" are true (step S1102: YES), no process that is to be performed at the sensor node 101 is present. Therefore, the sensor node 101, via the PMU 210, updates the value of $P_{capacitor}$ (step S1103). The sensor node 101, via the MCU 202, determines whether "$P_{capacitor}>P_{Send} \times D_{Size}+P_{MCU} \times D_{Size}$" is true (step S1104). If "$P_{capacitor}>P_{Send} \times D_{Size}+P_{MCU} \times D_{Size}$" is not true (step S1104: NO), electrical power enabling execution of the data processing indicated by the request signal is not available and therefore, the sensor node 101 ends the series of operations without accepting the request from the other sensor node 101.

If "$P_{capacitor}>P_{Send} \times D_{Size}+P_{MCU} \times D_{Size}$" is true (step S1104: YES), the sensor node 101, via the transmitting circuit 221, transmits an acceptance signal indicating acceptance of the execution of the data processing indicated by the received request signal (step S1105). The sensor node 101, via the MCU 202, registers the execution data into the data processing wait queue EQ (step S1106), and sets "$N_{MCU}=N_{MCU}+1$" (step S1107). The sensor node 101, via the MCU 202, executes the data processing indicated by the request signal (step S1108), and determines whether the execution has been completed (step S1109). If the execution has not been completed (step S1109: NO), the sensor node 101 returns to step S1109.

If the execution has been completed (step S1109: YES), the sensor node 101, via the MCU 202, sets "$N_{MCU}=N_{MCU}-1$" (step S1110). The sensor node 101, via the PMU 210, executes the boot process of the transmitting circuit 221 (step S1111), and via the transmitting circuit 221, transmits the execution results of the data processing (step S1112). The sensor node 101, via the PMU 210, updates the value of $P_{capacitor}$ (step S1113), and ends the series of operations.

As described, the sensor node performs charging by the electrical power generated by the sensor node. Therefore, data processing may be suspended consequent to insufficient electrical power. Thus, the sensor node determines based on the expected value of the time that elapses until execution is resumed by the sensor node or by another sensor node, whether to wait for charging and resume execution at the sensor node, or to transmit a request signal to another sensor node, before waiting for charging. As a result, execution of the data processing can be resumed sooner and therefore, the data processing can be completed sooner. For example, in the sensor network, information is communicated to a user terminal or a server via the parent device. When the sensor node detects an abnormality such as shaking or wall distortion consequent to an earthquake, if execution results can be transmitted to the parent device sooner, the user terminal and the like can be notified of the abnormality sooner, via the parent device 102.

Furthermore, if a request signal is transmitted to another sensor node before waiting for charging, the other sensor node may not accept the request. Thus, the expected value of the time that elapses until execution is resumed in case when a request signal is transmitted is assumed to be a value derived by the probability of the request being accepted and the time that elapses until execution is resumed in a case when the request is accepted, and the probability of the request not being accepted and the time that elapses until execution is resumed in a case when the request is not accepted. As a result, the operation that is estimated to resume execution sooner in both cases of acceptance and no acceptance is performed.

If the transmission of a request signal is determined to resume execution sooner, the threshold for the remaining charged electrical power is assumed to be a value based on the total value of the electrical power consumed for transmitting the request signal and the electrical power consumed for receiving information indicating acceptance of the request signal. The sensor node executes the data processing until execution of the data processing is completed, or until the remaining charged electrical power becomes less than the threshold. The sensor node suspends the execution of the data processing when the remaining charge electrical power becomes less than the threshold, and transmits a request signal to another sensor node. As a result, depletion of the electrical power before the request signal is transmitted can be prevented.

Further, after execution of the data processing has been completed, execution results have to be transmitted to the parent device. Thus, if it is determined that not transmitting a request signal enables the execution of the data processing to be resumed sooner, the sensor node executes the data processing until the execution of the data processing is completed, or until the remaining charged electrical power becomes less than a threshold based on the electrical power consumed for transmitting the execution results. The sensor node suspends the execution of the data processing when the remaining charged electrical power becomes less than the threshold and waits for charging. As a result, depletion of the electrical power before the transmission of the execution results can be prevented. Therefore, the sensor node can transmit the execution results to the parent device sooner.

Furthermore, if both the transmission of execution results and the execution of data processing are on standby consequent to the remaining electrical power, the sensor node gives priority to the transmission of execution results. As a result, the sensor node can transmit execution results to the parent device sooner.

According to one aspect of the present invention, data processing can be completed sooner.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A given communications apparatus included among a plurality of first communications apparatuses, performs multi-hop communication with the plurality of first communications apparatuses and thereby, transmits execution results of data processing performed at the given communications apparatus to a second communications apparatus that performs a process based on the execution results, the given communications apparatus comprising:
a harvester that charges a battery with self-generated electrical power;
a micro control unit that when execution of the data processing is suspended based on a remaining amount of the charged electrical power, can execute any one among a first operation by which a request signal requesting execution of the data processing is transmitted to another communications apparatus among the plurality of first communications apparatuses, and when the request of the request signal is accepted by the other communications apparatus, the data processing is not executed by the given communications apparatus, and when the request of the request signal is not accepted by the other communications apparatus, the execution of the data processing is started by the given communications apparatus after electrical power enabling the execution of the data processing to be completed is charged by the harvester, and a second operation by which, without transmission the request signal to the other communications apparatus, the execution of the data processing is started by the given communications apparatus after the electrical power enabling the execution of the data processing to be completed is charged by the harvester; and
a power management unit that:
obtains an expected value of a first time that elapses until the execution of the data processing is started by the micro control unit or the other communications apparatus in a case of the first operation being executed based on a probability that the other communications apparatus will accept the request for the execution of the data processing,
obtains a second time that elapses until the execution of the data processing is started by the micro control unit after the electrical power enabling the execution of the data processing to be completed is charged by the harvester, in a case of the second operation being executed,
compares the obtained expected value of the first time unit and the obtained second time, and
when the remaining amount of charged electrical power becomes less than a threshold, causes the micro control unit to execute any one among the first operation and the second operation, based on a comparison result obtained by the power management unit.

2. The given communications apparatus according to claim 1, wherein
the power management unit obtains the expected value of the first time by a sum of:
a product of a third time that is consumed for transmitting the request signal to the other communications apparatus and starting the execution of the data processing by the other communications apparatus and the probability that the request will be accepted by the other communications apparatus, and
a product of a fourth time that when the execution of the data processing is not accepted by the other communications apparatus, elapses until the execution of the data processing is started by the micro control unit after waiting for charging enabling the execution of the data processing to be completed and a probability that the request will not be accepted by the other communications apparatus.

3. The given communications apparatus according to claim 1, wherein
the power management unit, when the remaining amount of charged electrical power becomes less than the threshold during the execution of the data processing by the micro control unit and upon determining that the expected value of the first time shorter than the second time, causes the first operation to be executed by micro control unit, and upon determining that the second time is shorter than the expected value of the first time by the power management unit, causes the second operation to be executed by the micro control unit.

4. The given communications apparatus according to claim 3, wherein
the power management unit, upon determining that the expected value of the first time is shorter than the second time, causes the micro control unit to execute the data processing until the execution of the data processing is completed, or until the remaining amount of charged electrical power becomes less than the threshold, which is based on a sum of the electrical power consumed for transmitting the request signal and the electrical power consumed for receiving a signal indicating acceptance of the request signal; and when the remaining amount of charged electrical power becomes less than the threshold, causes the execution of the data processing by the micro control unit to be suspended and the first operation to be executed by the micro control unit.

5. The given communications apparatus according to claim 4, wherein
the power management unit compares the expected value of the first time and the second time, before the execution of the data processing is started by the micro control unit.

6. The given communications apparatus according to claim 3, wherein
the power management unit, upon determining that the second time is shorter than the expected value of the first time, causes the data processing to be executed by the micro control unit until the execution of the data processing is completed, or until the remaining amount of charged electrical power becomes less than the threshold, which is based on the electrical power consumed for transmitting the execution results; and when the remaining amount of charged electrical power becomes less than the threshold, causes the execution of the data processing by the micro control unit to be suspended and the second operation to be executed by the micro control unit.

7. The given communications apparatus according to claim 6, wherein
the power management unit compares the expected value of the first time and the second time, before the execution of the data processing is started by the micro control unit.

8. The given communications apparatus according to claim 1 further comprising
a transmitting circuit that transmits the execution results of the data processing, wherein
the power management unit, when based on the remaining amount of charged electrical power, transmission of the execution results by the transmitting circuit is waiting, causes the data processing to be executed by the micro control unit after the transmission of the execution results by the transmitting circuit.

9. A system comprising:
a plurality of first communications apparatuses; and
a second communications apparatus that performs a process based on execution results of data processing concerning at least one communications apparatus of the plurality of first communications apparatuses, wherein
the at least one communications apparatus of the plurality of first communications apparatuses:
when execution of the data processing at the at least one communications apparatus is suspended based on a remaining amount of electrical power charged by a harvester that charges a battery with self-generated electrical power, can execute any one among a first operation by which a request signal requesting execution of the data processing is transmitted to another communications apparatus among the plurality of first communications apparatuses, and when the request by the request signal is accepted by the other communications apparatus, the data processing is not executed by the at least one communications apparatus, and when the request by the request signal is not accepted by the other communications apparatus, the execution of the data processing is started by the at least one communications apparatus after electrical power enabling the execution of the data processing to be completed is charged by the harvester, and a second operation by which, without transmission of the request signal to the other communications apparatus, the execution of the data processing is started by the at least one communications apparatus after the electrical power enabling the execution of the data processing to be completed is charged by the harvester,
obtains an expected value of a first time that elapses until the execution of the data processing is started by the at least one communications apparatus or the other communications apparatus in a case of the first operation being executed based on a probability that the other communications apparatus will accept the request for the execution of the data processing,
obtains a second time that elapses until the execution of the data processing is started by the at least one communications apparatus after the electrical power enabling the execution of the data processing to be completed is charged by the harvester, in a case of the second operation being executed,
compares the obtained expected value of the first time and the obtained second time, and
causes based on a comparison result, any one of the first operation and the second operation to be executed when the remaining amount of the charged electrical power becomes less than a threshold during the execution of the data processing,
the other communications apparatus:
receives the request signal from the at least one communications apparatus,
determines whether the data processing indicated by the received request signal can be executed by the electrical power charged by a harvester that charges a battery with self-generated electrical power,
transmits to the at least one communications apparatus upon determining that the data process indicated by the received request signal can be executed, an acceptance signal indicating that the data processing indicated by the request signal can be executed, and
executes the data processing indicated by the request signal, upon determining that the data processing indicated by the request signal can be executed.

10. A communications method executed by a given communications apparatus that is included in a plurality of first communications apparatuses, performs multi-hop communication with the plurality of first communication apparatuses and thereby, transmits execution results of data processing performed at the given communications apparatus to a second communications that performs a process based on the execution results, the communications method comprising:
executing when execution of the data processing is suspended based on a remaining amount of electrical power charged by a harvester that charges a battery with self-generated electrical power, any one among a first operation by which a request signal requesting execution of the data processing is transmitted to another communications apparatus among the plurality of first communications apparatuses, and when the request of the request signal is accepted by the other communications apparatus, the data processing is not executed by the given communications apparatus, and when the request of the request signal is not accepted by the other communications apparatus, the execution of the data processing is started by the given communications apparatus after electrical power enabling the execution of the data processing to be completed is charged by the harvester, and a second operation by which, without transmission the request signal to the other communications apparatus, the execution of the data processing is started by the given communications apparatus after the electrical power enabling the execution of the data processing to be completed is charged by the harvester;

obtaining an expected value of a first time that elapses until the execution of the data processing is started by the micro control unit or the other communications apparatus in a case of the first operation being executed based on a probability that the other communications apparatus will accept the request for the execution of the data processing;

obtaining a second time that elapses until the execution of the data processing is stated by the given apparatus after the electrical power enabling the execution of the data processing to be completed is charged by the harvester, in a case of the second operation being executed; and comparing the obtained expected value of the first time and the obtained second time, wherein the executing includes executing any one of the first operation and the second operation based on comparison at the comparing, when the remaining amount of charged electrical power becomes lower than a threshold during the execution of the data processing.

\* \* \* \* \*